UNITED STATES PATENT OFFICE.

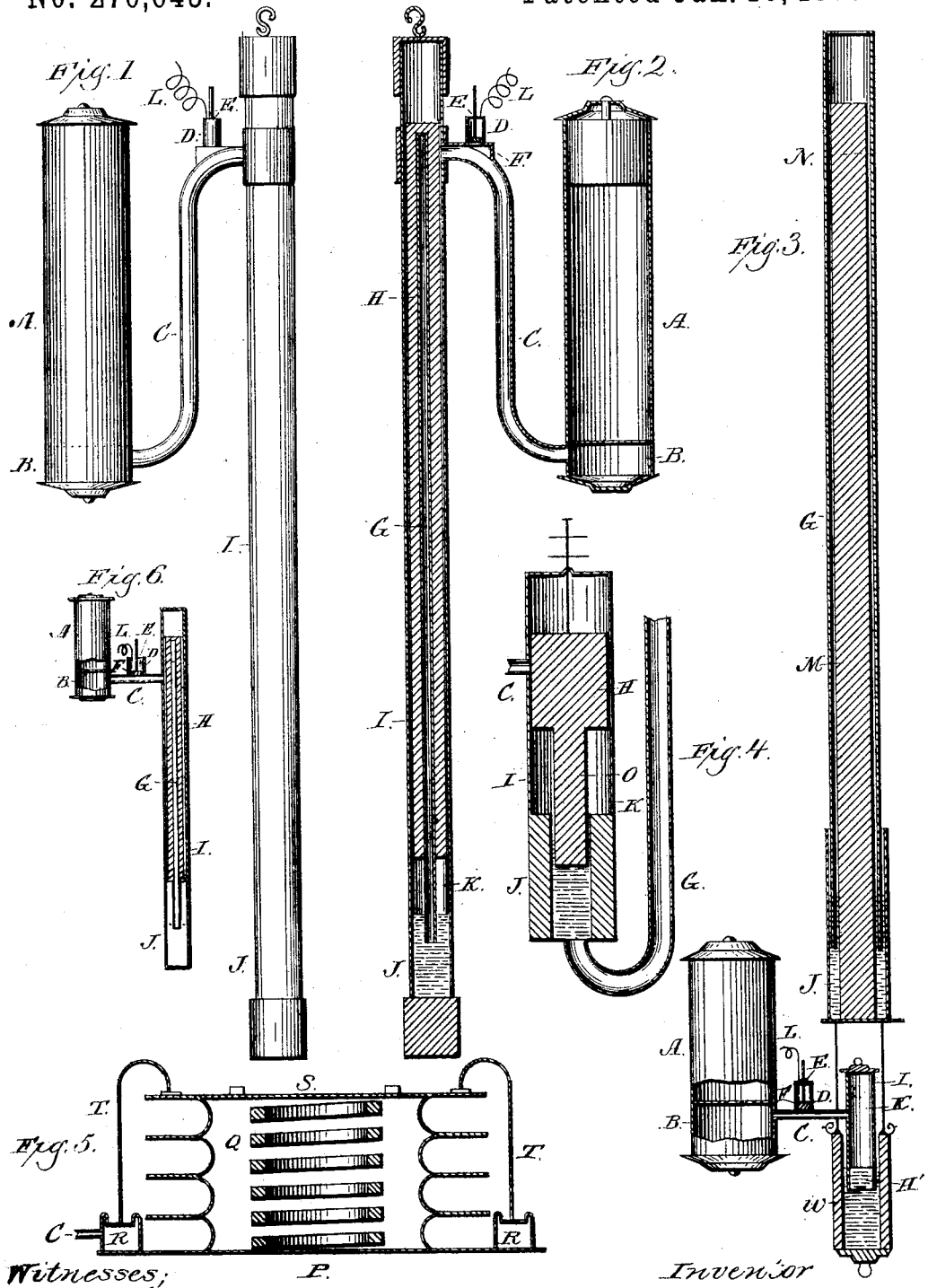

HARRISON DOWENS, OF NEW YORK, N. Y.

AUTOMATIC CORRECTING DEVICE FOR THERMOSTATS.

SPECIFICATION forming part of Letters Patent No. 270,643, dated January 16, 1883.

Application filed May 10, 1882. (Model.)

*To all whom it may concern:*

Be it known that I, HARRISON DOWENS, of New York, in the county and State of New York, have invented a new and useful Improvement in Correcting Devices for Thermostats, of which the following is a specification.

The invention relates to devices for sounding fire-alarms, closing dampers, &c., and depends for its action upon the expansion and contraction of confined air or other gas under variations of temperature against the atmosphere, in connection with a device for neutralizing the effect of unequal atmospheric pressure.

In devices heretofore made for regulating temperature various substances have been employed for utilizing the expansive power of heat. The expansion of solids is too slow to give instantaneous alarm in case of fire, and it does not admit of that nice adjustment required to regulate the temperature of apartments. The expansion of liquids is likewise too slow to give immediate warning so essential in case of fire. Moreover, the expansion of liquids under slight variations of temperature is so small that instruments in which they are employed cannot be made self-acting. Hence they are generally used in connection with electrical apparatus, a column of mercury being ordinarily employed to close the circuit at a given rise of temperature. While this arrangement leaves nothing to be desired in point of precision, not only is it powerless to respond to a sudden rise of temperature, but it involves the complication and expense of an electrical apparatus. Finally, confined air expanding against the weight of the atmosphere alone is subject to an error on account of the variation in the weight of the atmosphere itself, which renders the apparatus utterly unreliable. Confined air at the freezing-point expands one part in every four hundred and ninety-one for every degree of heat. To expand one-tenth in volume therefore requires nearly 50° Fahrenheit. The weight of the atmosphere, as indicated by the barometer, is subject to variations amounting to nearly one-tenth of its entire weight, and as the volume of air is inversely proportional to the pressure it follows that confined air acting against the weight of the atmosphere alone is subject to a variation in volume due to change in atmospheric pressure equivalent to about 50° of heat—an error which utterly unfits this class of instruments for maintaining an even temperature, and greatly impairs their capacity to sound a fire-alarm at the proper moment.

To obviate the error from variations in atmospheric pressure, a correcting attachment has been devised, consisting of a barometer-tube attached to one arm of a lever, an air-thermometer being suspended from the other extremity of the lever. Mercury, however, instead of water, is used in the stem of the air-thermometer. The arms of the instrument being in equilibrium at any given temperature, an increase in atmospheric pressure drives an equal quantity of mercury up the barometer-tube and the stem of the air-thermometer, and the equilibrium is not destroyed. An increase in temperature expels a portion of mercury from the stem of the air-thermometer, moving the lever and sounding the alarm.

The object of my invention is to provide a new and improved correcting attachment whereby a single column of mercury may be employed in place of the two columns heretofore used; to relieve the working parts of the instrument from the weight of the liquid; to make it susceptible of use in connection with an electrical apparatus, and, if desired, to substitute an aneroid for a mercurial barometer where a compact form of the instrument is desired, suitable for travelers.

In the drawings which accompany and form part of this specification similar letters of reference indicate like parts.

Figure 1 is a perspective view of a device embodying my invention, and Fig. 2 is a vertical longitudinal section of the same.

A is a closed air-chamber communicating with the chamber B, partly filled with liquid. The chamber B is connected by the pipe C to the cup D.

D is a cylindrical cup attached at any convenient point to the tube C, and having sufficient capacity to contain the overflow from the chamber B. The cup D, also partly filled with liquid, communicates with the outer air by an orifice at E.

F is a float of wood or hollow metal, having a vertical motion in the cup D, and adjusted to ascend with the rise of the liquid in D.

G is a barometer-tube inclosed in a shaft or piston, H. The piston H moves freely in the cylinder I. The lower portion of the cylinder J is filled with mercury, like the cup of an ordinary barometer. The space above the mercury between the cylinder and piston contains oil or other liquid. The thickness and density of the piston H are so adjusted with reference to the weight of the mercury in the barometer G that the piston floats in the liquid contained in I. The lower portion of the piston H is of diminished thickness, leaving a greater space above the surface of the mercury to be occupied by the liquid at K. The space between the cylinder and piston communicates with the cup D by the pipe C.

The instrument is prepared for use as follows: A portion of liquid is poured into the space between the cylinder and piston until it rises to the mouth of the tube C, floating the piston with the barometer-tube. A quantity of the liquid is likewise introduced into the chamber B. The inclosed air in the chamber A is then raised to the temperature at which the instrument is required to act, and the float F is adjusted to the surface of the liquid in the cup D, and connected with the alarm or other attachment to be governed by it. A train of ordinary clock-work is used to move the alarm or automatic damper. The train of the alarm or damper, when wound, is held in place by a pawl and ratchet. The pawl is connected with the float by a cord or wire. The ascent of the float disengages the pawl and sets the alarm in motion; or the float may be connected directly with the damper without the intervention of a train. The damper is then balanced to turn freely on pivots, and connected to the float by a crank and connecting-rod. The motion of the float opens and closes the damper.

The operation of the device is as follows: An increase in atmospheric pressure drives a portion of the liquid in the cup D into the chamber B, condensing the air in A; but meanwhile the pressure of the atmosphere causes the mercury to mount up the tube G, the increased weight of which causes it to sink in the surrounding liquid until the equilibrium is restored. The liquid expelled from the space K by the descending piston flows through the pipe C into the cup D, taking the place of the liquid forced into the chamber B. When the instrument is properly adjusted the quantity of liquid remaining in D is the same as before. Any increase in temperature expels a portion of liquid from the chamber B, raising the float and sounding the alarm. If it is desired to use the instrument in connection with an electrical apparatus, one end of the circuit-wire is fixed at L in place of the float, the other being connected with the cup D. A circuit is formed, as in an ordinary telegraphic apparatus, by wires leading from the positive and negative poles of a battery, the catch of the alarm being connected with the armature of the magnet. The wire at L is insulated from the cup D at the point of contact, and extended downward far enough to reach the surface of the liquid in the cup when the temperature rises to the point at which the instrument is set to act. When the temperature falls below that point the surface of the liquid falls and the circuit is broken. The rise of the liquid closes the circuit and sounds the alarm.

A modification of my correcting attachment suitable for use where a large and powerful instrument is required is shown in Fig. 3.

G is a barometer-tube containing a weighted rod or cylinder, M, rising above the surface of the mercury at N. The cup J is attached to the rod M, and rises and falls with it. The rod M likewise carries at its lower extremity a piston fitted to the stationary cylinder I. An air-tight cylinder is conveniently formed by placing a cup, W, partly filled with mercury H', over the open end of the cylinder, as shown in the diagram. When the atmospheric pressure increases the rod M is forced upward, lifting the cup W and diminishing the space K. When the atmospheric pressure is diminished the rod falls until its descent is checked by the displacement of liquid. The space K is filled with liquid, and connected with B by the pipe C, as before; or K may be filled with air and connected directly with the air-chamber A. The movements of the cylinder neutralize the variations in atmospheric pressure, and leave the liquid in B to D to be affected by change of temperature only.

The cup W, with its contained liquid, is used in place of an ordinary piston to insure the perfect sealing of the cylinder and to obviate friction. An ordinary piston may be used, if desired.

A form of the attachment which may be applied to an ordinary barometer is shown in Fig. 4. A T-shaped piston, H O, formed by placing two cylinders of unequal diameter one upon the other, floats upon the surface of the mercury in the barometer-cup J. The cylinder I, having a greater diameter than that of the cup J, is placed directly above it, as shown in the diagram. The space K above the mercury is filled with oil or other liquid. The motion of the T-shaped piston H O with the rise and fall of the mercury in the cup J regulates the flow of the liquid through the pipe C, as before.

Where a compact form of the instrument is required an aneroid-barometer is used in place of the mercurial barometer.

P, Fig. 5, is a metallic box with flexible corrugated sides. A spiral spring, Q, is adjusted to resist the external atmospheric pressure, and the box is exhausted of air.

R is a reservoir having flexible sides, and containing oil or other liquid. The motion of the face S is communicated by the rods T T to the reservoir R, regulating the flow of liquid through the pipe C, as before.

In Fig. 6 I show in section and on a reduced scale a slightly-modified form of the device shown in Figs. 1 and 2.

I claim as new and desire to secure by Letters Patent—

1. The combination of the barometer G with the cylinder and piston I H, operating substantially as and for the purpose specified.

2. The combination of the barometer G with the cylinder and piston I H and the reservoir B, operating substantially as and for the purpose specified.

3. The combination of the barometer G with the cylinder and piston I H, the reservoir B, and the air-chamber A, operating substantially as and for the purpose specified.

4. The combination of the barometer G with the cylinder and piston I H, the reservoir B, the air-chamber A, and the float F, operating substantially as and for the purpose specified.

HARRISON DOWENS.

Witnesses:
  E. BAUMANN,
  CHARLES E. SPRAGUE.